`US009114869B1`

(12) United States Patent
Barrett et al.

(10) Patent No.: US 9,114,869 B1
(45) Date of Patent: Aug. 25, 2015

(54) DECOMPRESSION PANEL AND LATCH (71) Applicant: The Boeing Company, Chicago, IL (US)

(72) Inventors: Casey J. Barrett, Renton, WA (US); Khoa Duy Nguyen, Renton, WA (US); Mark A. Wolf, Auburn, WA (US); Andrew H. Wu, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 13/910,503

(22) Filed: Jun. 5, 2013

(51) Int. Cl.
*B64C 1/14* (2006.01)
(52) U.S. Cl.
CPC ................................ *B64C 1/1469* (2013.01)
(58) Field of Classification Search
None
See application file for complete search history.

(56) References Cited

U.S. PATENT DOCUMENTS

| 5,765,883 | A | * | 6/1998 | Dessenberger et al. | 292/92 |
| 5,782,511 | A | * | 7/1998 | Schwarz | 292/219 |
| 6,866,226 | B2 | | 3/2005 | Pratt et al. | |
| 6,866,227 | B2 | * | 3/2005 | Pratt et al. | 244/129.4 |
| 7,533,911 | B2 | * | 5/2009 | Homner | 292/63 |
| 7,578,475 | B2 | * | 8/2009 | Pratt et al. | 244/129.4 |
| 7,762,738 | B2 | * | 7/2010 | Homner | 403/315 |
| 7,770,942 | B2 | * | 8/2010 | Homner | 292/95 |
| 8,602,464 | B2 | * | 12/2013 | Yadollahi | 292/194 |
| 8,882,033 | B2 | * | 11/2014 | Rittner et al. | 244/118.5 |
| 8,919,699 | B2 | * | 12/2014 | Kress et al. | 244/129.5 |
| 2003/0052227 | A1 | * | 3/2003 | Pittman | 244/118.5 |

* cited by examiner

*Primary Examiner* — Christopher P Ellis
*Assistant Examiner* — Medhat Badawi
(74) *Attorney, Agent, or Firm* — Baldauff IP, LLC; Michael J. Baldauff, Jr.

(57) ABSTRACT

A decompression panel for use in a door of an aircraft disclosed herein includes bi-directional latching mechanisms. A differential pressure sensor disengages upon a decompression event in a compartment of an aircraft, allowing latch hooks to disengage from a panel latch of the decompression panel. Once disengaged, the decompression panel can rotate to vent air in a compartment of higher pressure to the compartment experiencing the decompression event.

20 Claims, 12 Drawing Sheets

DECOMPRESSION PANEL AND LATCH

BACKGROUND

During typical flight operations, many aircraft fly at altitudes where the atmospheric pressure is significantly less than the atmospheric pressure at ground level. To provide for the comfort and safety of passengers, the interior of aircraft are typically pressurized to simulate ground level environmental conditions during flight. The difference in pressure between the inside of the aircraft and the outside of the aircraft can be significant at operational altitudes. The pressure difference increases as the aircraft altitude increases.

Because of the difference in pressure, a breach in the hull of the aircraft can cause the inside of the aircraft to decompress by venting interior air into the atmosphere. If the breach is large enough, a sudden and violent decompression event may occur, causing a sharp and significant drop of pressure in the aircraft. Breaches in aircraft may be due to various reasons.

The flight deck of an aircraft is typically separated from the cabin by a separating wall. Movement into and out of the flight deck is facilitated by a flight deck door. Even though the flight deck may not be completely isolated from the cabin, physically and environmentally, a sudden drop in pressure in the flight deck may cause the flight deck door to open into the flight deck. This may provide for a degree of pressure equalization between the flight deck and the cabin by allowing higher-pressure air in the unaffected compartment, the cabin, to exit into the lower pressure flight deck through the flight deck door.

In some aircraft, in lieu of or in addition to the flight deck door opening, the flight deck door may have one or more decompression panels installed in the flight deck door. The decompression panels can have devices that maintain the panel closed during normal operation but allow the decompression panel to open in a decompression event. Because a decompression event may occur in both the flight deck and the cabin, conventional decompression mechanisms may not be suitable for decompression events that may occur in either the cabin or the flight deck.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, a latching mechanism for a decompression panel in a flight deck door is provided. The latching mechanism may include a first latch hook coupled to a first latch coupler biased to rotate around an axis in a forward direction, a second latch hook coupled to a second latch coupler biased to rotate around the axis in an aftward direction, a latch bar that couples the first latch coupler and the second latch coupler to a hook spike comprising a pin gap, and a differential pressure sensor. The differential pressure sensor may be configured to sense a differential pressure across the flight deck door and retract a latch pin from the pin gap during a decompression event to provide a simultaneous rotation of the first latch hook and the second latch hook.

According to another aspect of the disclosure herein, a flight deck door is provided. The flight deck door may include a decompression panel having a panel latch and a latching mechanism. The latching mechanism may include a first latch hook coupled to a first latch coupler biased to rotate around an axis in a forward direction, a second latch hook coupled to a second latch coupler biased to rotate around the axis in an aftward direction, a latch bar that couples the first latch coupler and the second latch coupler to a hook spike, the hook spike comprising a pin gap, and a differential pressure sensor. The differential pressure sensor may be configured to sense a differential pressure across the flight deck door. The differential pressure sensor may be further configured to retract a latch pin from the pin gap during a decompression event to provide a simultaneous rotation of the first latch hook and the second latch hook.

According to yet another aspect, a method of decompressing an aircraft is provided. The method may include providing a decompression panel having a bi-directional latching mechanism comprising a first latch hook rotatable in a first direction and a second latch hook rotatable in a second direction, sensing a decompression event in a compartment in an aircraft, retracting a latch pin from a hook spike, and disengaging a first latch hook from the latch hook in the first direction and the second latch hook in the second direction from a panel latch to allow the decompression panel to rotate in a direction towards the compartment with the decompression event.

The features, functions, and advantages discussed herein can be achieved independently in various embodiments of the present disclosure as taught herein, combinations thereof, or may be combined in yet other embodiments, further details of which can be seen with reference to the following description and drawings.

DETAILED DESCRIPTION

The following detailed description is directed to a bi-directional decompression panel and latching mechanism for use in an aircraft door. In some configurations, a differential pressure sensor may detect a differential pressure between two or more compartments of an aircraft, possibly indicating a decompression event. In a decompression event, a latch pin of the differential pressure sensor may decouple from the latching mechanism. Once decoupled, the latching mechanism may retract one or more latches securing a decompression panel. The retraction of the latches allows the decompression panel to open, providing a passageway in which air in the aircraft may equalize across the decompression panel. In some configurations, the differential pressure sensor may be oriented in a transverse configuration to reduce the probability of inadvertent decoupling in a non-decompression event. In other configurations, aircraft personnel may use the decompression panel as an ingress or egress into or out of the flight deck.

In the following detailed description, references are made to the accompanying drawings that form a part hereof, and in which are shown by way of illustration specific embodiments or examples. Referring now to the drawings, in which like numerals represent like elements throughout the several figures, aspects of a bi-directional decompression panel and latching mechanism for use in an aircraft door will be presented.

Figure 1:
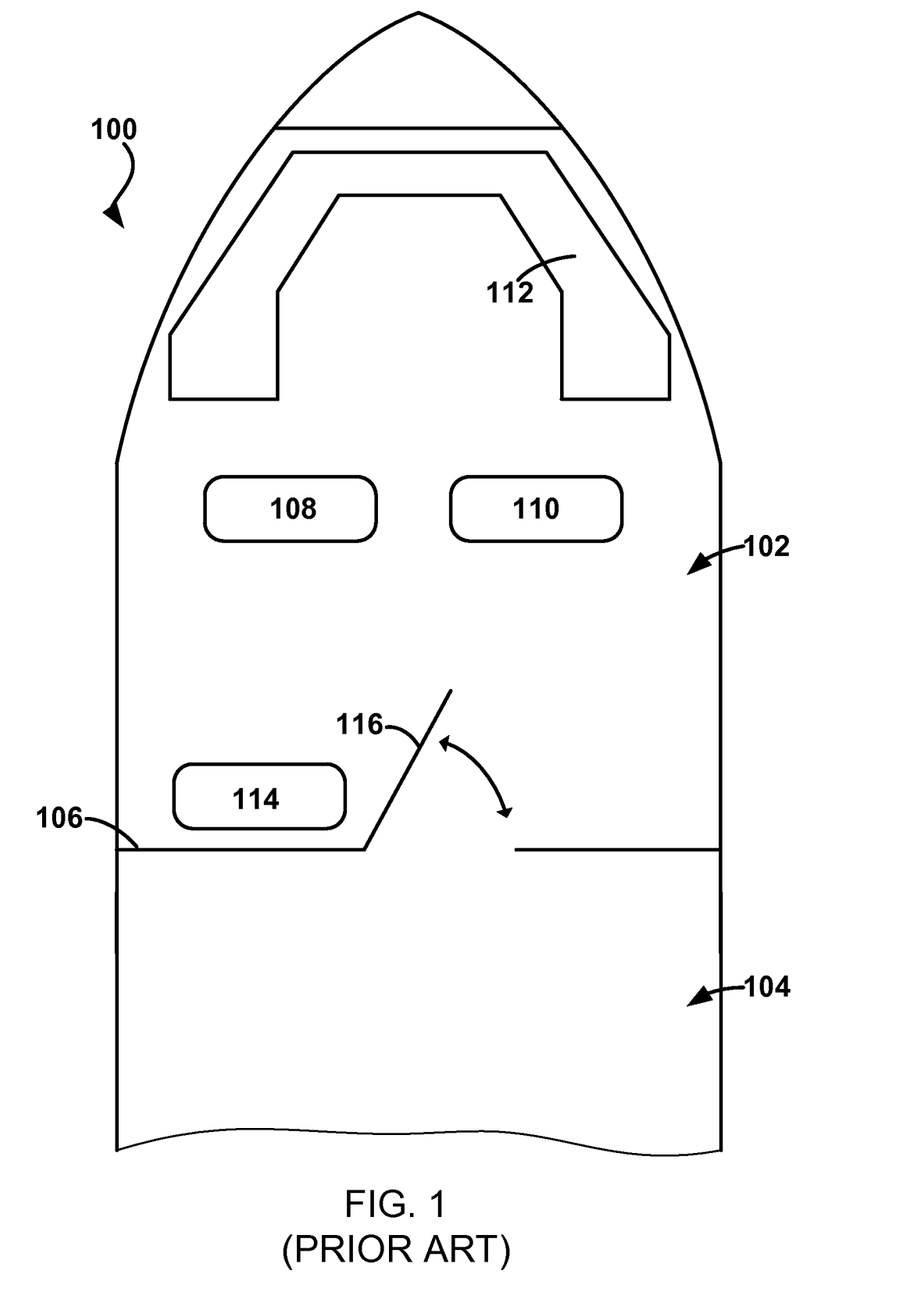
FIG. 1 is top down, cross-sectional view of a conventional aircraft fuselage.
Figure 2:
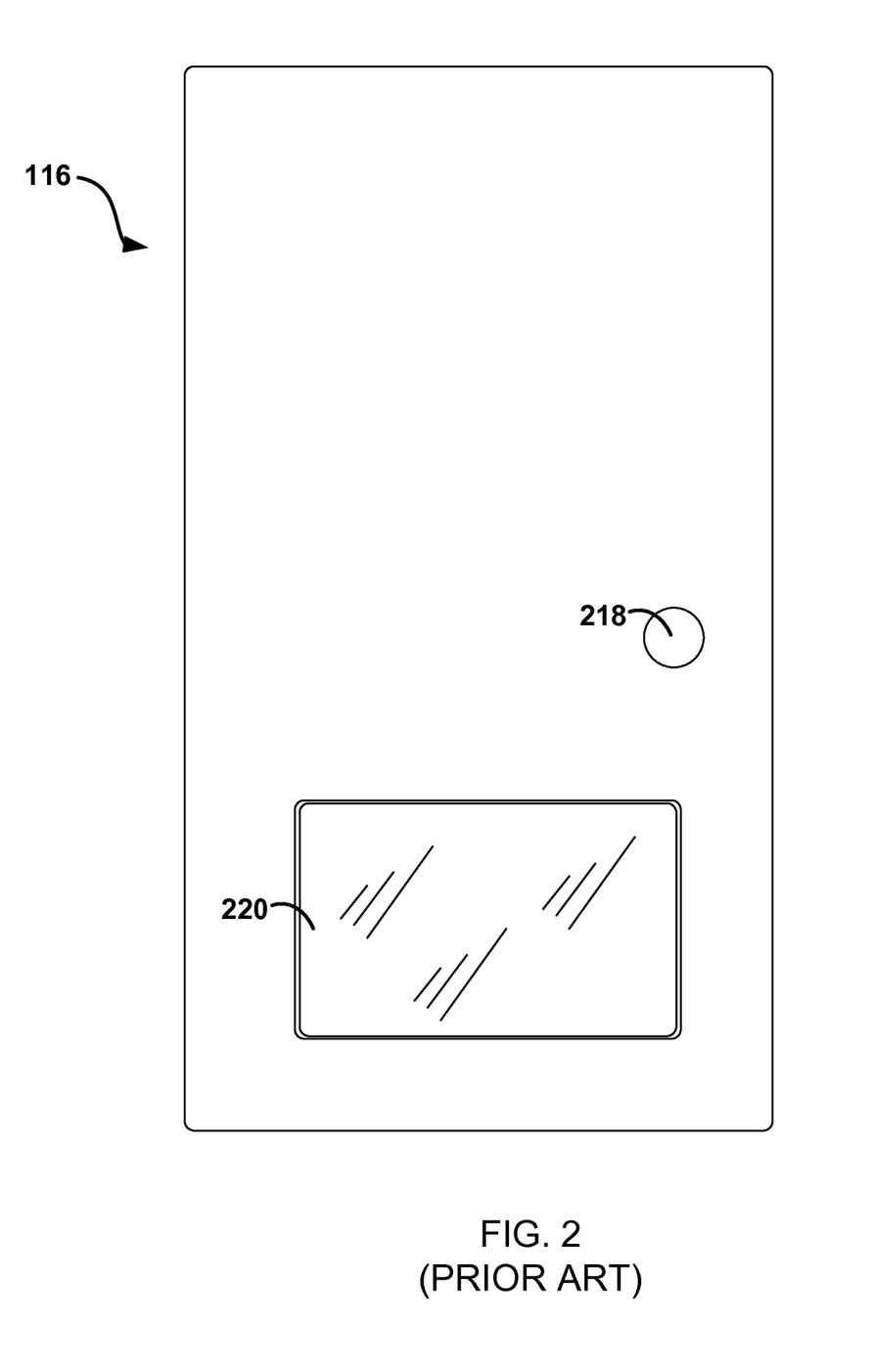
FIG. 2 is a side view of a conventional flight deck door.

In a conventional aircraft, the interior of the aircraft may be divided into several compartments. FIG. 1 illustrates the front section of an aircraft 100 in which a flight deck 102 is partitioned from a cabin area 104 by partition 106. The flight deck 102, which may also be called a cockpit, provides an operational area for a pilot 108 and a co-pilot 110 to operate the aircraft 100 using flight control panel 112. An auxiliary crewmember 114 may also be stationed in the flight deck 102. A flight deck door 116 may be used to control access to the flight deck 102 from the cabin 104. FIG. 2 provides further detail regarding the flight deck door 116.

Illustrated in FIG. 2 is a conventional flight deck door 116. As briefly mentioned above, the flight deck door 116 is used to control access to the flight deck 102. An opening mechanism 218, such as a doorknob, may be used to open and close the flight deck door 116 like a typical door. During flight, the flight deck door 116 is normally closed and locked to prevent inadvertent or unwanted entry into the flight deck 102. The flight deck door 116 is typically manufactured to be able to withstand attempts at forced entry and explosions up to a certain magnitude. The flight deck door 116 can act as a bather to prevent unauthorized entry into the flight deck 102.

While providing a barrier of entry into the flight deck 102, in the case of a decompression event in the flight deck 102, the flight deck door 116 has a decompression panel 220. The decompression panel 220 can open when the pressure in the flight deck 102 drops either to a certain amount or at a certain rate. The decompression panel 220 opens to allow the atmosphere in the aircraft 100 to equalize to some degree across the flight deck door 116 and the partition 106.

Conventional flight deck doors, such as the flight deck door 116 of FIG. 2, provide for pressure equalization in one direction. That is, pressure from the cabin 104 moves through the decompression panel 220 and into the flight deck 102 to being the pressure equalization process. However, a decompression event may occur in other parts of the aircraft. The following figures illustrate various mechanisms in which pressure may be equalized in two directions across a flight deck door while still providing the entry bather requirements to the flight deck needed for flight deck doors.

Figure 3:
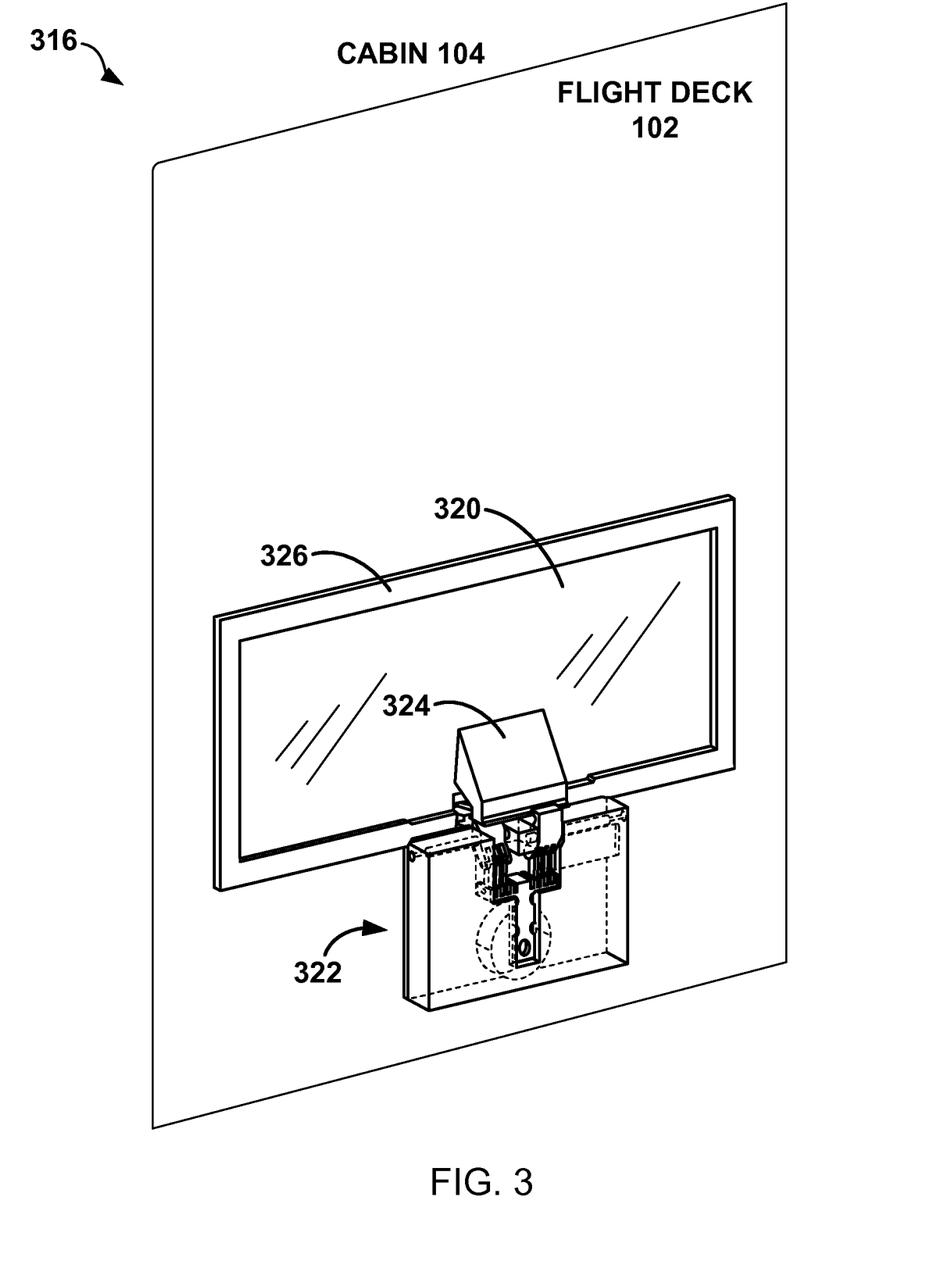
FIG. 3 is a perspective view of a panel and latching mechanism, according to various embodiments.

FIG. 3 is a perspective view of a flight deck door 316 configured to control entry into the flight deck 102 as well as equalize pressure from the cabin 104 into the flight deck 102 or, in the reverse, from the flight deck 102 into the deck. It should be understood that the technologies described herein are not limited to use on the flight deck door 316. The description provided herein relating to the flight deck door 316 is merely exemplary and does not limit the scope of the present disclosure. The flight deck door 316 has a decompression panel 320 with a latching mechanism 322 that latches a panel latch 324 in both directions, explained in further detail in the following figures. The decompression panel 320 is enclosed by a frame 326 that is independently movable to facilitate equalization while providing a level of physical barrier to entry into the flight deck 102.

As briefly discussed above, it may be desirable or required to have a decompression panel capable of withstanding impact forces, such as forced entry attempts or explosions, that move into the flight deck 102, while also capable of providing equalization from the cabin 104 into the flight deck 102 during a decompression event. In one configuration, the frame 326 can provide structural support in the event of a forced entry attempt while allowing the decompression panel 320 to open into the flight deck 102 in a decompression event.

The frame 326 provides structural support to the decompression panel 320 while the latching mechanism 322 is engaged with the panel latch 324. This structural support helps to bolster the strength of the decompression panel 320. For example, a person may attempt to kick the panel 320 to force the panel to open into the flight deck 102. The frame 326 provides a counteracting force to the attempted entry, thus, in some configurations, increasing the ballistic strength of the decompression panel 320. However, as described above, during a decompression event, the latching mechanism 322 will disengage from the panel latch 324, allowing the frame 326 and the decompression panel 320 to move forward into the flight deck 102.

In the case of a decompression event in the cabin 104, the latching mechanism 322 disengages from the panel latch 324, allowing the decompression panel 320 to swing aft into the cabin 104 to provide a vent path to equalize pressure across the flight deck door 316. The frame 326 remains in the position illustrated in FIG. 3. In the case of a decompression event in the flight deck 102, the latching mechanism 322 disengages from the panel latch 324, allowing the decompression panel 320 and the frame 326 to swing forward into the flight deck 102 to provide a vent path to equalize the pressure across the flight deck door 316.

Figure 4:
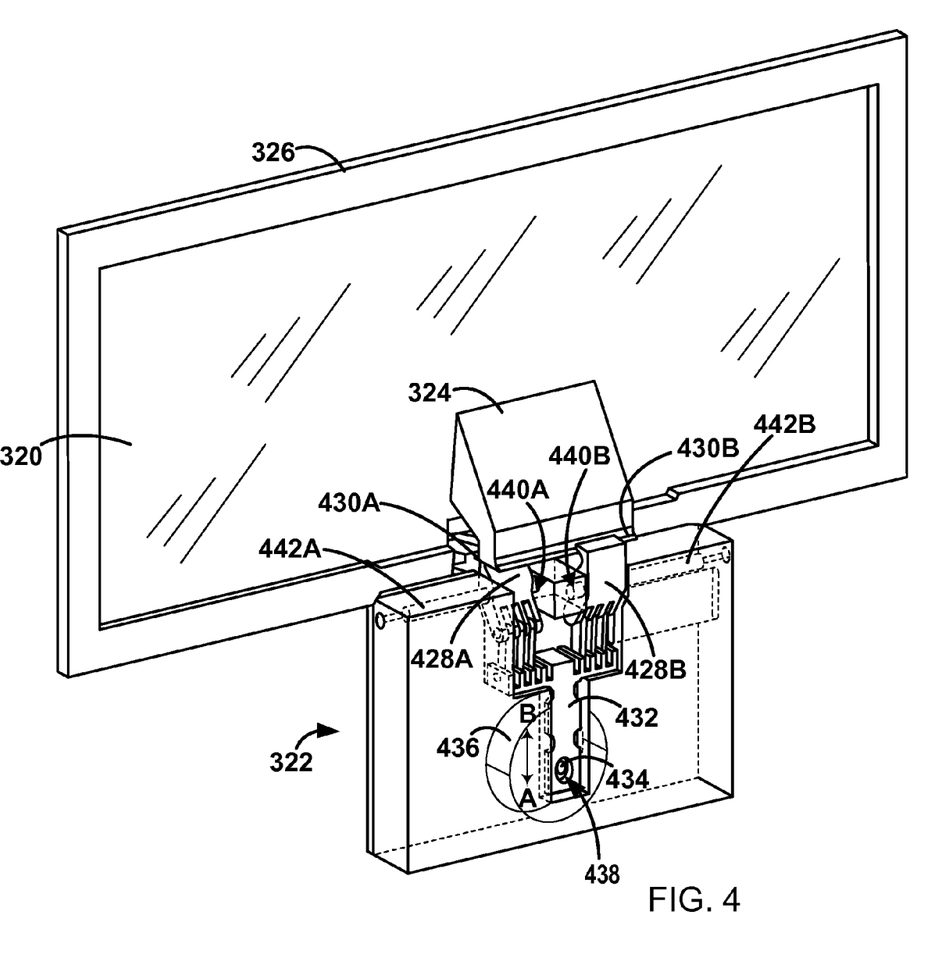
FIG. 4 is a perspective view of a latching mechanism, according to various embodiments.

FIG. 4 is a side perspective view of the decompression panel apparatus 300 with a decompression panel 320 disposed in the frame 326. Also illustrated are the latching mechanism 322 and the panel latch 324. As described above, the panel latch 324 and the latching mechanism 322 are normally engaged with each other to control entry into the flight deck 102 and disengage from each other in the event of a decompression event in either the flight deck 102 or the cabin 104.

To engage and disengage the panel latch 324, the latching mechanism 322 has latch hooks 428A and 428B that engage with latch edges 430A and 430B, respectively, of the panel latch 324. When engaged with the latch edge 430A, the latch hook 428A helps to prevent the aftward movement of the decompression panel 320 into the cabin. In a similar manner, when engaged with the latch edge 430B, the latch hook 428B, along with the frame 326, helps to prevent the forward movement of the decompression panel 320 into the flight deck 102.

During normal operation, the latch hook 428A and the latch hook 428B engage and disengage from the panel latch 324 simultaneously. The movement of the latch hooks 428A and 428B are controlled by a hook spike 432. The lateral movement of the hook spike 432 is controlled by a latch pin 434 of a differential pressure sensor 436. The latch pin 434 extends into and retracts from a pin gap 438. The differential pressure sensor 436 is configured to detect the pressure difference between the flight deck 102 and the cabin 104. Upon sensing a pressure difference of a certain amount, the differential pressure sensor 436 will cause the latch pin 434 to retract from the pin gap 438. In some configurations, one or more differential pressure sensors (not illustrated) may be used in conjunction with the differential pressure sensor 436.

When the latch pin 434 retracts from the pin gap 438, the hook spike 432 is reconfigured from its secured state with the latch pin 434 disposed within the pin gap 438 to its unsecured state with the latch pin 434 removed from the pin gap 438. In its unsecured state, the hook spike 432 can move upwards from location A towards location B along axis AB. The movement of the hook spike 432 towards location B causes the latch hooks 428A and 428B to rotate about axis point 440A and 440B, respectively.

In some configurations, the hook spike 432 may be spring-loaded by rotation pins 442A and 442B. The rotation pins 442A and 442B may bias the latch hooks 428A and 428B in their respective directions. The latch hook 428B may be biased so that upon retraction of the latch pin 434 from the pin gap 438, the rotation pin 442B rotates the latch hook 428B in a first direction. In some configurations, the first direction may in a direction towards the flight deck 102. In another example, the latch hook 428B may be biased so that upon retraction of the latch pin 434 from the pin gap 438, the rotation pin 442B rotates the latch hook 428B in a second direction.

In some configurations, the second direction may be towards to the cabin 104. The rotation pins 442A and 442B may have springs or other mechanisms that provide a rotational force to the rotation pins 442A and 442B. This rotational force of the rotation pins 442A and 442B may be counteracted by the latch pin 434 when disposed within the pin gap 438. When the latch pin 434 disengages from the pin gap 438, the rotational force of the rotation pins 442A and 442B may be unopposed, causing the rotation pins 442A and 442B to rotate. The rotation of the rotation pins 442A and 442B rotates the latch hooks 428A and 428B about axis points 440A and 440B, respectively. This provides for the simultaneous rotation of the latch hooks 428A and 428B around the axis. The simultaneous rotation of the latch hooks 428A and 428B disengages the latch hooks 428A and 428B from the panel latch 324.

The simultaneous rotation of the latch hooks 428A and 428B about axis point 440A and 440B causes the latch hooks 428A and 428B to disengage from the latch edges 430A and 430B. When disengaged, from the latch edges 430A and 430B, the decompression panel 320 is free to move from in the aftward direction as well as with the frame 326 in the forward direction. The decompression panel 320 opens in the direction of airflow. Air in the area of the aircraft 100 of higher pressure will attempt to move towards an area of lower pressure. The difference in pressure imparts an opening force on the decompression panel 320 in the direction of the airflow. The latch hooks 428A and 428B and the hook spike 432 are explained in more detail in FIG. 5.

Figure 5:
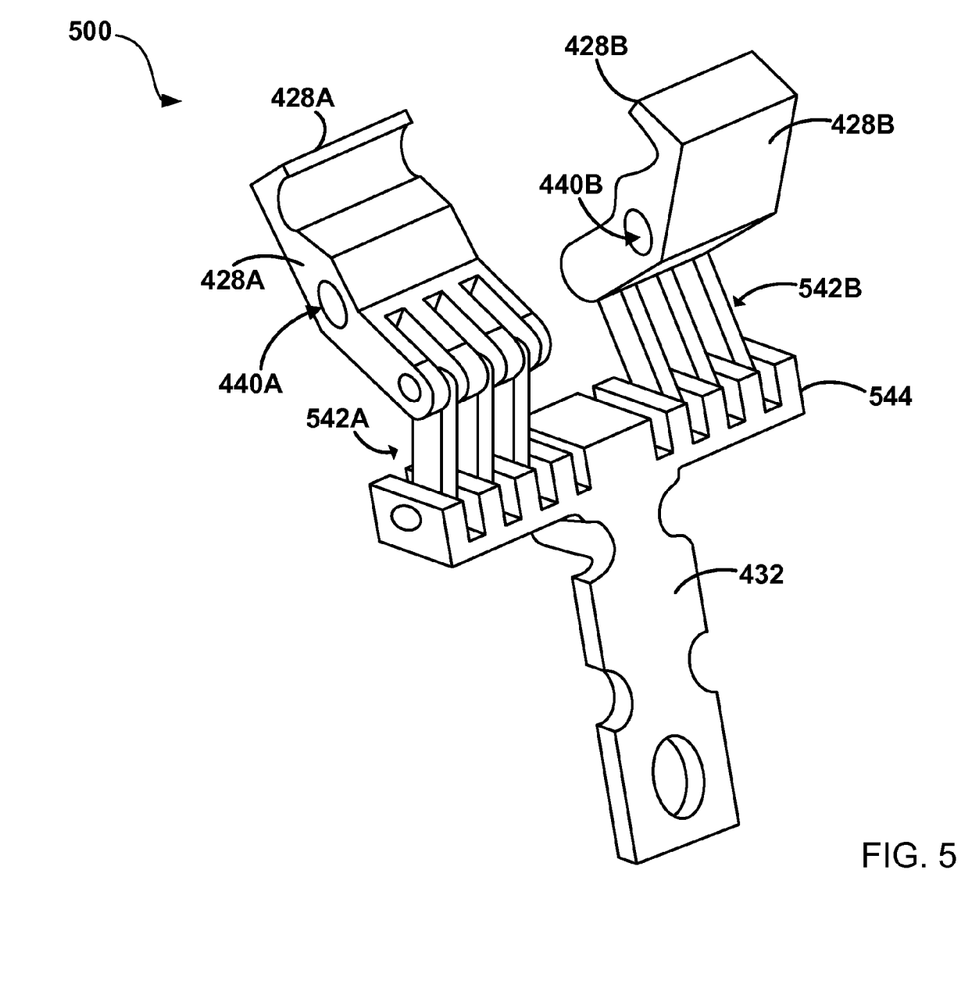
FIG. 5 is a perspective view of latch hooks for use in a latching mechanism, according to various embodiments.

FIG. 5 is a side perspective view of hook apparatus 500 that may be used in a latching mechanism, such as the latching mechanism 322 of FIGS. 3 and 4. The hook apparatus 500 includes the hook spike 432 and the latch hooks 428A and 428B. The latch hooks 428A and 428B are coupled to the hook spike 432 by latch couplers 542A and 542B, respectively. The latch couplers 542A and 542B transfer the lateral movement of the hook spike 432 to the latch hooks 428A and 428B, causing the rotation of the latch hooks 428A and 428B about axis point 440A and 440B, respectively. To facilitate the simultaneous movement of the latch hooks 428A and 428B, the latch couplers 542A and 542B are coupled to a latch bar 544. The latch bar 544 is coupled to the hook spike 432. Because the latch hooks 428A and 428B, the latch couplers 542A and 542B, and the hook spike 432 are coupled together, the movement of each individual component causes or is caused by a movement of the other components.

Figure 6:
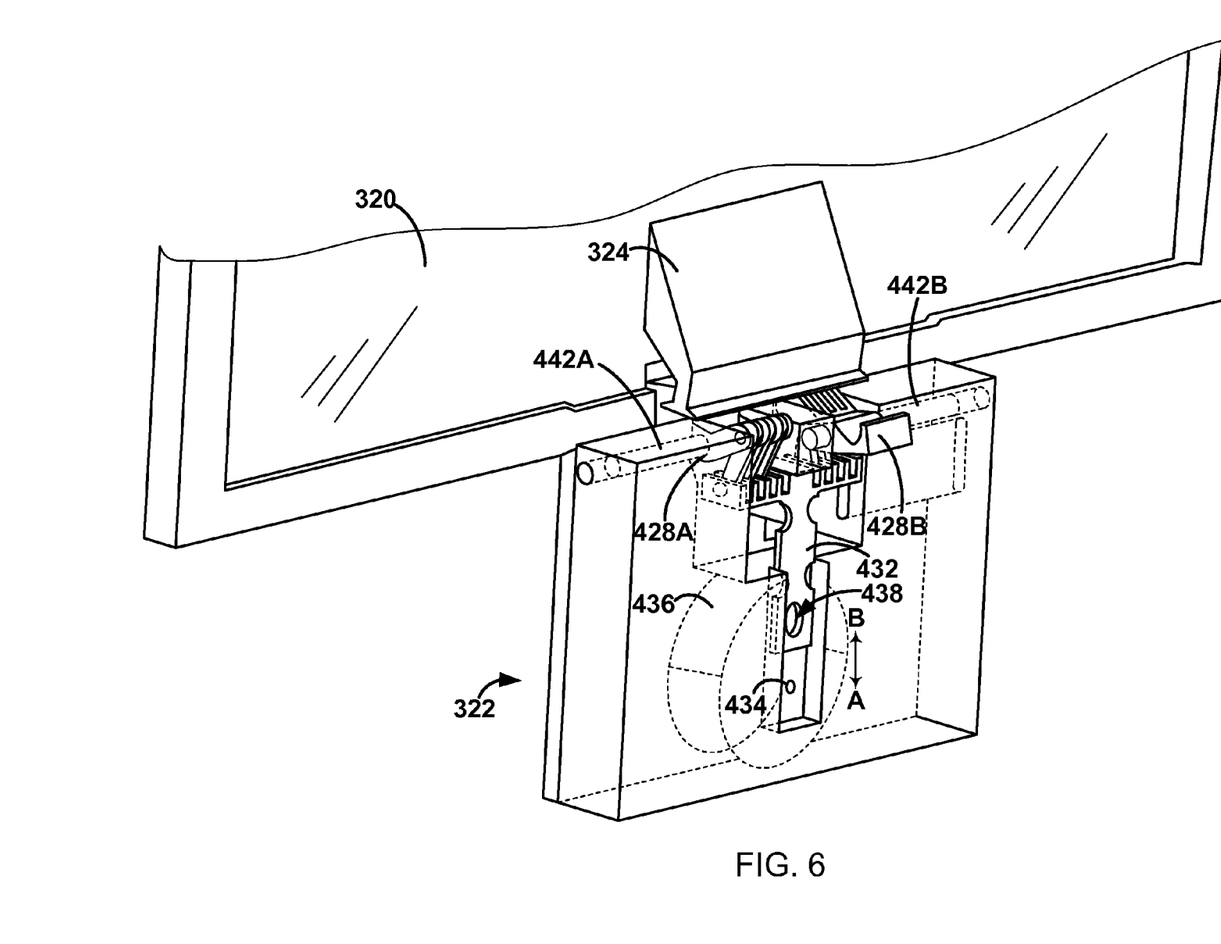
FIG. 6 is a perspective view of a differential pressure mechanism with the latch hooks disengaged from the panel latch, according to various embodiments.
Figure 7:
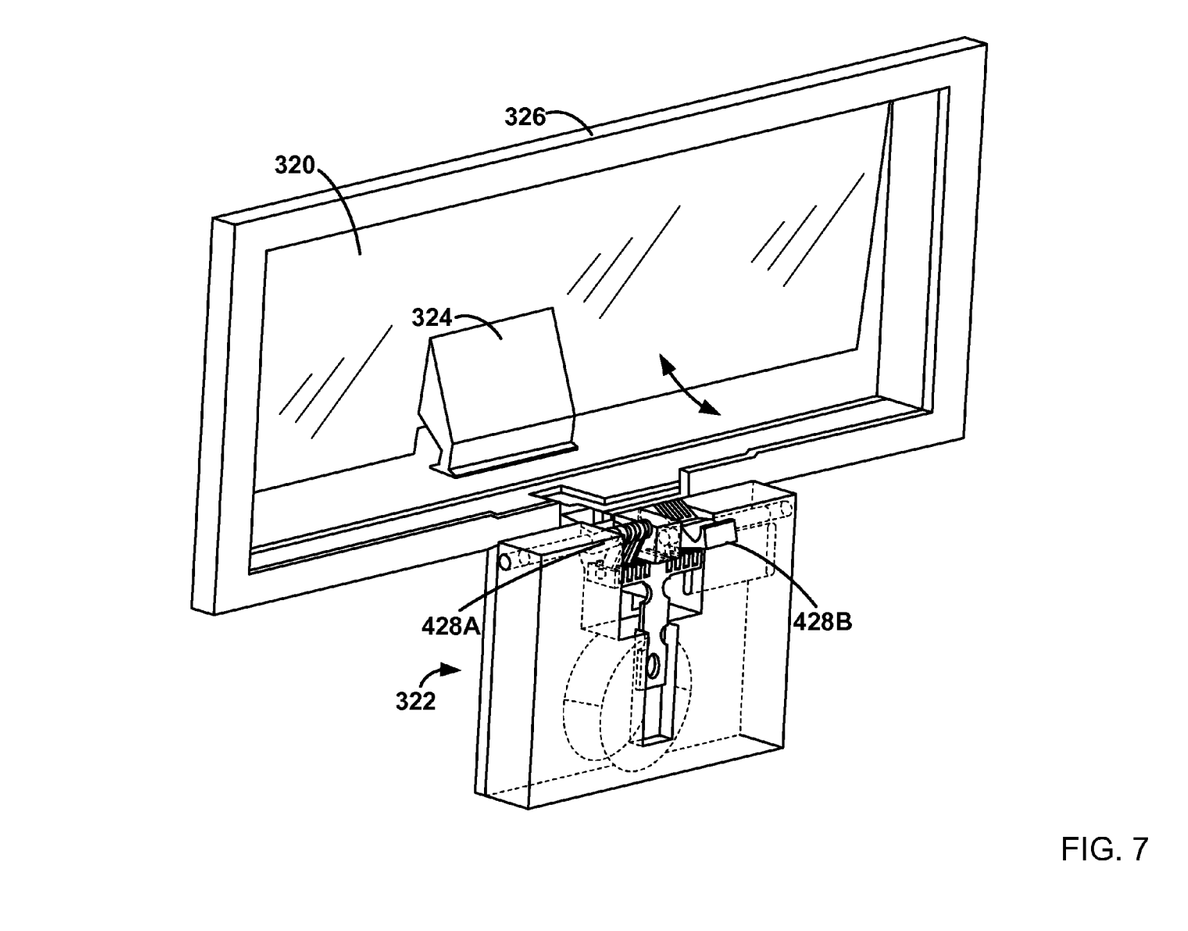
FIG. 7 is a perspective view of a differential pressure mechanism showing the opening of a decompression panel, according to various embodiments.

This integral movement facilitates the simultaneous disengagement of the panel latch 324 from the latch hooks 428A and 428B when a decompression event occurs, as illustrated in more detail in FIGS. 6 and 7 below. FIG. 6 is a side perspective view of the decompression panel 320 after a decompression event has occurred but prior to the movement of the decompression panel 320. FIG. 7 is a side perspective view of the decompression panel 320 after a decompression event has occurred and after the decompression panel 320 has moved due to the flow of air.

In FIG. 6, the differential pressure sensor 436 has detected a differential pressure across the decompression panel 320. The differential pressure causes the latch pin 434 to retract into the differential pressure sensor 436, thus allowing the hook spike 432 to move from location A towards location B along the AB axis. In one configuration, the rotation pins 442A and 442B may be spring-loaded, causing the latch hooks 428A and 428B to rotate. When the latch hooks 428A and 428B rotate, the latch hooks 428A and 428B disengage or decouple from the panel latch 324. Because the panel latch 324 and the decompression panel 320 are an integral unit, the disengagement of the latch hooks 428A and 428B from the panel latch 324 causes the disengagement of the decompression panel 320.

In some instances, it may be preferable that the latch hooks 428A and 428B simultaneously disengage from the panel latch 324. Because the decompression panel 320 may travel in either direction, depending on which area of the aircraft 100 experiences a decompression event, the simultaneous disengagement of the latch hooks 428A and 428B from the panel latch 324 can allow movement of the decompression panel 320 in either direction. Further, the simultaneous disengagement may also help reduce the number of components needed in the latching mechanism 322. The differential pressure sensor 436 and hook spike 432 can facilitate the movement of the two latch hooks 428A and 428B. Reducing the number of components necessary may help increase reliability while reducing production costs, among other possible benefits. It should be understood, however, that the present disclosure is not limited to any particular benefit.

Once the latch hooks 428A and 428B are disengaged from the panel latch 324, the decompression panel 320 may be free to move in either direction. A movement of the decompression panel 320 when the cabin 104 decompresses is illustrated in FIG. 7. In FIG. 7, the latch hooks 428A and 428B are disengaged from the panel latch 324, allowing the movement of the panel latch 324 in either direction. As illustrated in FIG. 7, the decompression panel 320 has moved in an aftward direction in relation to the position illustrated in FIG. 6.

In this configuration, the decompression panel provides a vent path for equalization from the flight deck 102 to the cabin 104. There may be various reasons why the cabin 104 may depressurize. This may open the cabin to the low pressure in the atmosphere surrounding the cabin, causing a decompression event. In the case of a decompression event occurring in the flight deck 102, the decompression panel 320 will preferably move forward into the flight deck, as illustrated in FIG. 8.

Figure 8:
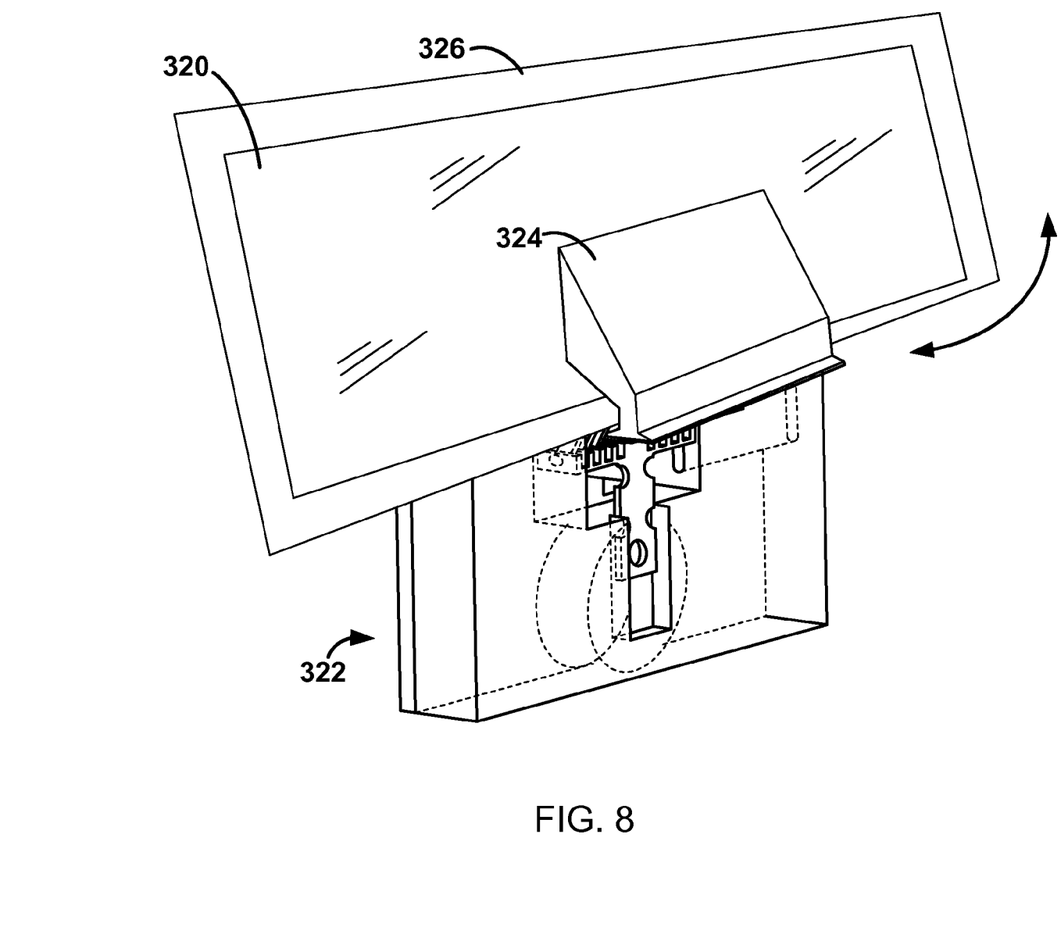
FIG. 8 is a perspective view of a differential pressure mechanism showing the opening of a decompression panel into a flight deck, according to various embodiments.

In FIG. 8, the latch mechanism 322 has disengaged from the panel latch 324. Because the decompression event has occurred in the flight deck 102, the atmospheric pressure in the flight deck 102 may decrease, creating a pressure differential between the flight deck 102 at a lower pressure and the cabin 104 at a higher pressure. Thus, in order to provide some degree of equalization, the decompression panel 320 will preferably move forward into the flight deck 102, as illustrated in FIG. 8. The decompression panel 320 and the frame 326 preferably rotate forward into the flight deck 102 together.

As discussed above, when the latch hooks 428A and 428B are engaged with the panel latch 324, the frame 326 can provide additional structure support to the decompression panel 320 to increase the strength of the decompression panel 320. For example, the frame 326 may help prevent the decompression panel 320 from opening when the decompression panel 320 sustains impact with force from a mass. Other aspects of the disclosure provided herein may provide a degree of protection against inadvertent or unwanted opening of the decompression panel 320.

Figure 9:
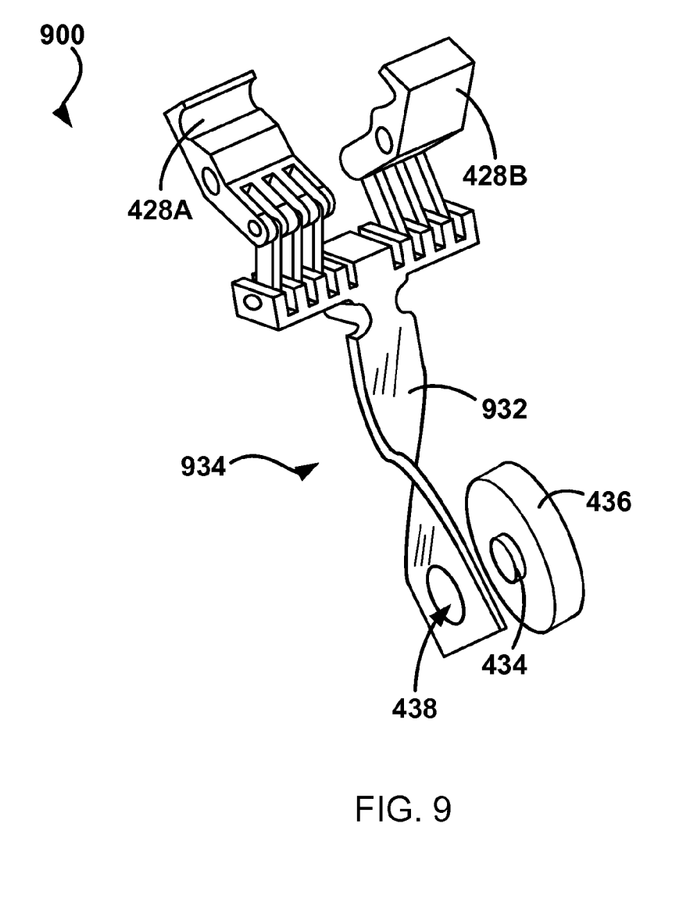
FIG. 9 is a perspective view of a transverse differential pressure sensor, according to various embodiments.

FIG. 9 illustrates a locking apparatus 900 in which the differential pressure sensor 436 is disposed in a transverse configuration to the latch hooks 428A and 428B. The transverse configuration of the locking apparatus 900 may help reduce inadvertent or unwanted entrance into a flight deck. A flight deck door will be subjected to forces during the normal operation of the door. In an inline configuration, as illustrated in FIGS. 3-7, the latch pin 434 of the differential pressure sensor 436 may retract into the differential pressure sensor 436 when a strong force is applied to the flight deck door 116. If the latch pin 434 retracts to a point that it is no longer positioned in the pin gap 438, the differential pressure sensor 436 may disengage from the hook spike 432. If the hook spike 432 is free to move, the latch hooks 428A and 428B may disengage from the panel latch 324, allowing the decompression panel 320 to move freely.

To reduce the probability that a striking force imparted on the differential pressure sensor 436 may allow the decompression panel 320 to open, the locking apparatus 900 includes the differential pressure sensor 436 in a transverse configuration. As used herein, a transverse configuration includes a direction in line with a central axis of the aircraft 100 from a nose of the aircraft 100 to a tail of the aircraft 100. To allow the engagement of the differential pressure sensor 436 with the latch hooks 428A and 428B, a transverse hook spike 932 is provided.

The transverse hook spike 932 includes a bend of approximately 90 degrees at a location 934 along the hook spike 932. The bend provides for the ability of the differential pressure sensor 436 to be disposed in a transverse configuration while maintaining the latch hooks 428A and 428B in the configuration illustrated in FIGS. 4-7 above. In this configuration, a sudden forward or aftward movement would preferably not cause the latch pin 434 to retract from the pin gap 438.

Figure 10:
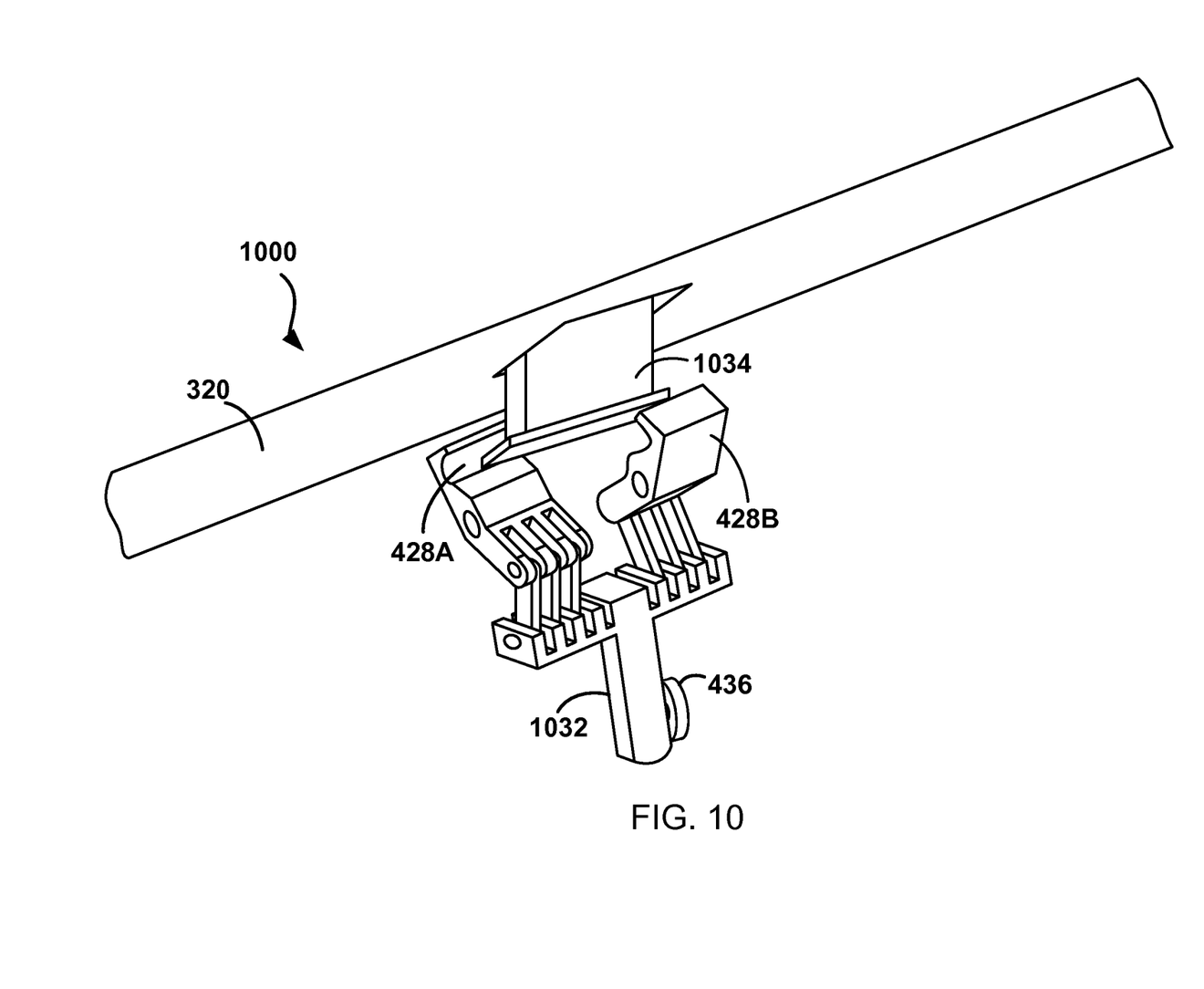
FIG. 10 is a perspective view of an alternate transverse differential pressure sensor, according to various embodiments.

FIG. 10 is a perspective view of a locking apparatus 1000 in which the pressure sensor 436 is disposed in a transverse configuration to the latch hooks 428A and 428B. As mentioned above, various forces may act on a flight deck door. Some of the forces may not be decompression events, or other events, in which it is desirable for the latch hooks 428A and 428B to disengage from a panel latch 1034. In the configuration illustrated in FIG. 10, a hook spike 1032 is provided. The hook spike 1032 is configured to allow the differential pressure sensor 436 to be placed in a transverse configuration. The panel latch 1034 may also be configured to extend out of a central portion of the decompression panel 320. As illustrated, the hook spike 1032 does not include a bend, as described above with regard to the hook spike 932. Along with ease of construction, the lack of a bend may increase the structural rigidity of the hook spike 1032.

Figure 11:
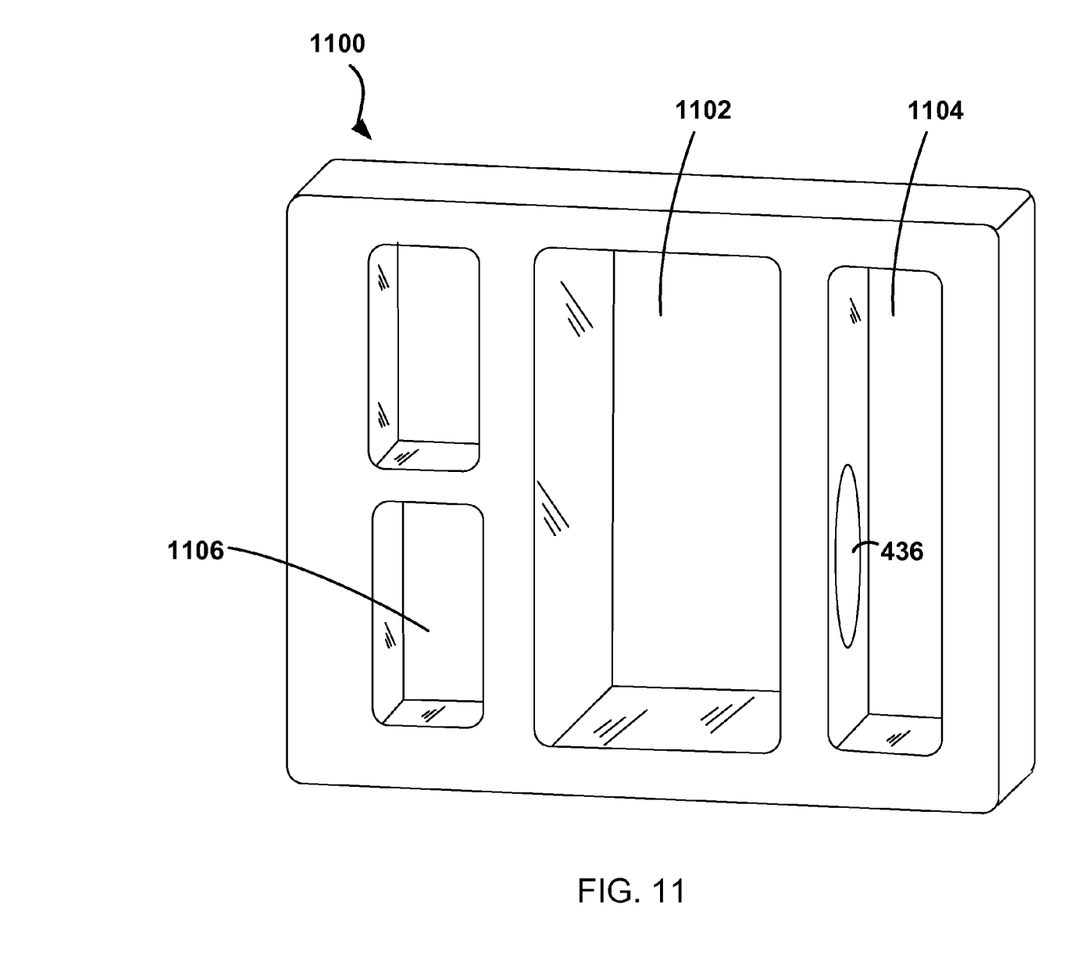
FIG. 11 is a perspective view of a latch enclosure, according to various embodiments.

FIG. 11 is a perspective view of a latch enclosure 1100 that may be used to enclose a latch mechanism within the flight deck door 116. The latch enclosure 1100 may include one or more sections. For example, a first section 1102 may house a locking apparatus, such as the locking apparatus 900 or the locking apparatus 1000. The differential pressure sensor 436 may be installed in another section, such as a second section 1104. The second section 1104 may be charged with airplane air. In order to determine a differential pressure, a further section, such as a third section 1106 may be open to ambient air. The differential pressure sensor 436 may sense the difference in pressure between the ambient air in the third section 1106 and the airplane air in the second section 1104. At a certain differential pressure, the differential pressure sensor 436 may release the latch hooks 428A and 428B, allowing the decompression panel 320 to be released.

Figure 12:
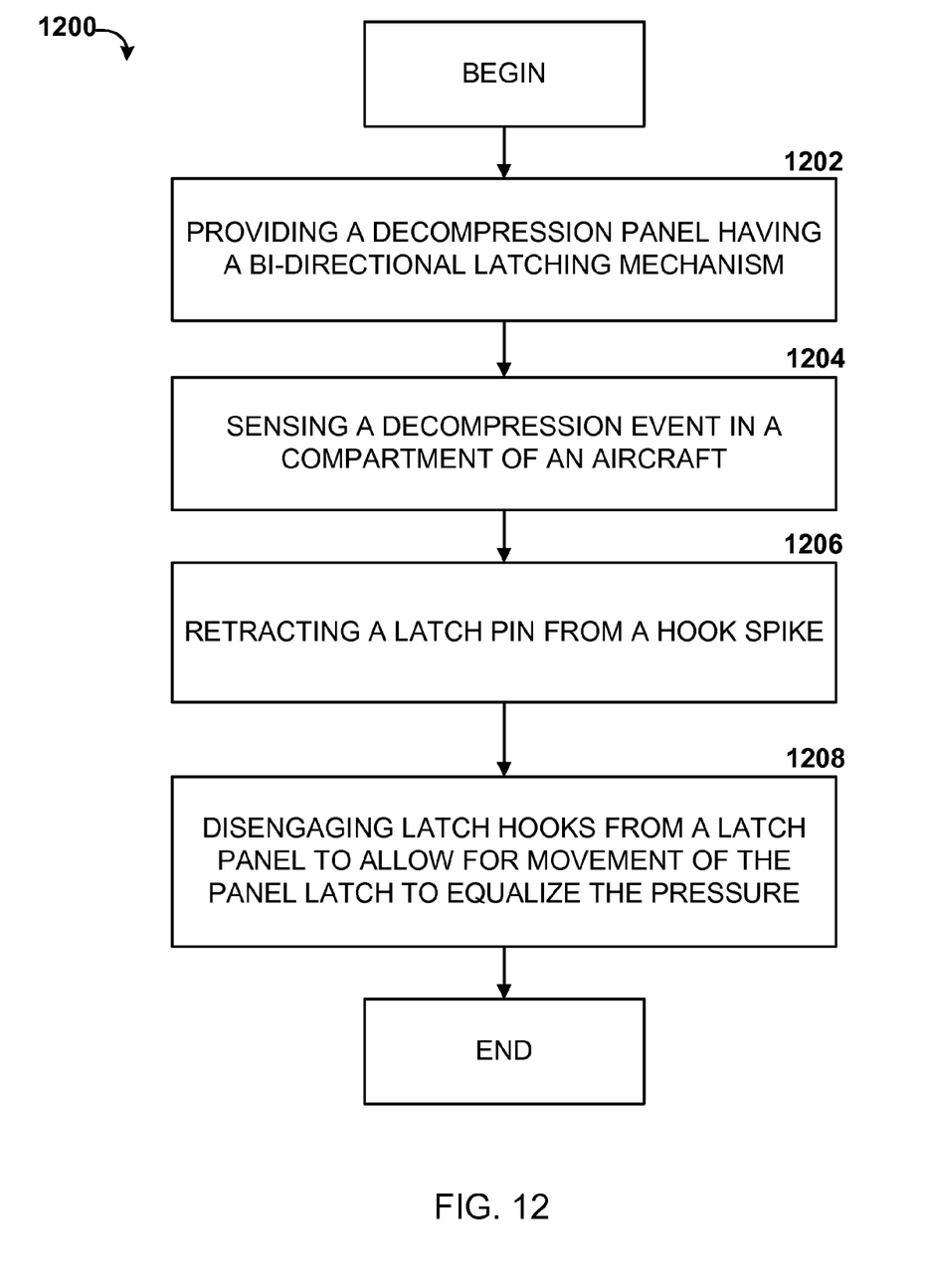
FIG. 12 is an exemplary routine for decompressing an aircraft compartment, according to various embodiments.

Turning now to FIG. 12, an illustrative routine 1200 for decompressing an aircraft compartment is provided herein. Unless otherwise indicated, it should be appreciated that more or fewer operations may be performed than shown in the figures and described herein. Additionally, unless otherwise indicated, these operations may also be performed in a different order than those described herein.

The routine 1200 starts at operation 1202, where a decompression panel 320 having a bi-directional latching mechanism 322 is provided. The decompression panel 320 allows air from an area of higher pressure to vent to an area in which a decompression event is occurring, which would be the area of lower pressure. The decompression panel 320 may receive additional structural support using the frame 326. The frame 326 may be configured to rotate in a forward direction into a flight deck 102, but may also remain relatively stationary if the decompression panel 320 rotates aftward into the cabin 104.

The bi-directional latching mechanism 322 can include a differential pressure sensor 436 that detects air pressure in two or more compartments in the aircraft 100. The differential pressure sensor may include a latch pin 434. The latch pin 434 may secure in place a latching mechanism. The latching mechanism may secure a panel latch 324 on the decompression panel 320.

The routine 1200 proceeds to operation 1204, where a decompression event in a compartment in an aircraft is sensed. The decompression event may occur when the interior of an aircraft at altitude is exposed to the exterior of the aircraft. The exposure may cause pressurized air in the compartment of the aircraft to vent to the exterior of the aircraft, which is typically at a lower pressure than the interior of the aircraft. The resulting loss in air in the interior of the aircraft reduces the pressure in the affected compartments, thus causing a decompression event. The differential pressure sensor 436 may detect that the pressure in one compartment being monitored has suffered from a rapid decline, thus indicating a decompression event.

The routine 1200 proceeds to operation 1206, where the latch pin 434 from the differential pressure sensor 436 retracts. This allows a latching mechanism to release latch hooks 428A and 428B from a panel latch 324. The release of the latch hooks 428A and 428B allows the decompression panel 320 to rotate in either direction. In one configuration, if the decompression panel rotates 320 into the cabin 104 of an aircraft 100, only the decompression panel 320 rotates. In another configuration, if the decompression panel 320 rotates into the flight deck 102 of an aircraft 100, the frame 326 surrounding the decompression panel 320 will also rotate into the flight deck 102.

The routine 1200 proceeds to operation 1208, where the latch hooks 428A and 428B are disengaged from the panel latch 324, allowing for movement of the panel latch 324 to allow air to move from a compartment of higher pressure into a compartment of lower pressure. The air movement provides a way in which the pressures in the compartments may equalize. It should be understood, however, that the compartments might never equalize. The decompression event in one compartment may be significant enough that even with the venting provided by an open decompression panel, the pressures in the two compartments do not equalize. The routine thereafter ends.

The subject matter described above is provided by way of illustration only and should not be construed as limiting. A configuration using any particular number of an element is exemplary only and is not an intent to limit the presently disclosed subject matter to any particular number of that element. Various modifications and changes may be made to the subject matter described herein without following the example embodiments and applications illustrated and described, and without departing from the true spirit and scope of the present disclosure, which is set forth in the following claims.

What is claimed is:

1. A latching mechanism for a decompression panel in a flight deck door, comprising:
   a first latch hook coupled to a first latch coupler biased to rotate around an axis in a forward direction;
   a second latch hook coupled to a second latch coupler biased to rotate around the axis in an aftward direction;
   a latch bar that couples the first latch coupler and the second latch coupler to a hook spike comprising a pin gap; and
   a differential pressure sensor configured to sense a differential pressure across the flight deck door and retract a latch pin from the pin gap during a decompression event to provide a simultaneous rotation of the first latch hook and the second latch hook.

2. The latching mechanism of claim 1, further comprising a first rotation pin coupled to the first latch hook to bias the first latch hook and a second rotation pin coupled to the second latch hook to bias the second latch hook.

3. The latching mechanism of claim 2, wherein the first rotation pin and the second rotation pin are spring-loaded.

4. The latching mechanism of claim 1, wherein the first latch hook and the second latch hook are disenagable from a latch edge of a panel latch of the decompression panel.

5. The latching mechanism of claim 1, wherein the differential pressure sensor is in a transverse configuration.

6. The latching mechanism of claim 5, wherein the hook spike comprises a bend to couple the differential pressure sensor in the transverse configuration to the latch bar.

7. The latching mechanism of claim 1, wherein the simultaneous rotation of the first latch hook and the second latch hook disengages the first latch hook and the second latch hook from a panel latch of the decompression panel.

8. A flight deck door, comprising:
   a decompression panel having a panel latch; and
   a latching mechanism comprising;
      a first latch hook coupled to a first latch coupler biased to rotate around an axis in a forward direction,
      a second latch hook coupled to a second latch coupler biased to rotate around the axis in an aftward direction,
      a latch bar that couples the first latch coupler and the second latch coupler to a hook spike, the hook spike comprising a pin gap, and
      a differential pressure sensor configured to sense a differential pressure across the flight deck door, the differential pressure sensor configured to retract a latch pin from the pin gap during a decompression event to provide a simultaneous rotation of the first latch hook and the second latch hook.

9. The flight deck door of claim 8, further comprising a first rotation pin coupled to the first latch hook to bias the first latch hook and a second rotation pin coupled to the second latch hook to bias the second latch hook.

10. The flight deck door of claim 8, further comprising a latch enclosure comprising a section charged with airplane air and a section open to ambient air.

11. The flight deck door of claim 8, wherein the first latch hook and the second latch hook are disenagable from a latch edge of the panel latch of the decompression panel.

12. The flight deck door of claim 8, wherein the differential pressure sensor is in a transverse configuration.

13. The flight deck door of claim 8, wherein the simultaneous rotation of the first latch hook and the second latch hook disengages the first latch hook and the second latch hook from a panel latch of the decompression panel.

14. The flight deck door of claim 8, further comprising a frame surrounding the decompression panel.

15. The flight deck door of claim 14, wherein the frame provides structural support to the decompression panel.

16. The flight deck door of claim 14, wherein the frame rotates with the decompression panel in one direction and remains stationary while the decompression panel rotates in another direction.

17. A method of decompressing an aircraft compartment, comprising:
   providing a decompression panel having a bi-directional latching mechanism comprising a first latch hook rotatable in a first direction and a second latch hook rotatable in a second direction;
   sensing a decompression event in a compartment in an aircraft;
   retracting a latch pin from a hook spike; and
   disengaging a first latch hook from the latch hook in the first direction and the second latch hook in the second direction from a panel latch to allow the decompression panel to rotate in a direction towards the compartment with the decompression event.

18. The method of claim 17, wherein the first direction is to a cabin of the aircraft and the second direction is to a flight deck of the aircraft.

19. The method of claim 17, wherein a frame rotates with the decompression panel if the rotation is to a flight deck of the aircraft and the frame remains stationary if the rotation of the decompression panel is to a cabin of the aircraft.

20. The method of claim 17, wherein the first latch hook and the second latch hook disengage from the panel latch simultaneously.

* * * * *